United States Patent [19]

Keller

[11] 4,289,229

[45] Sep. 15, 1981

[54] CONVEYOR TABLE SLAB STOP ARRANGEMENT

[75] Inventor: Norman L. Keller, Pittsburgh, Pa.

[73] Assignee: Pullman Incorporated, Chicago, Ill.

[21] Appl. No.: 88,497

[22] Filed: Oct. 26, 1979

[51] Int. Cl.³ .......................................... B65G 13/075
[52] U.S. Cl. ................................. 198/633; 193/35 A; 198/491
[58] Field of Search .............. 193/35 A, 40, 32, 35 G; 198/491, 492, 530–532, 633; 104/254, 252, 249; 293/136

[56] References Cited

U.S. PATENT DOCUMENTS 1,427,878  9/1922  Weinberg ............................. 293/136
2,498,989  2/1950  Erland et al. ................... 198/633 X

FOREIGN PATENT DOCUMENTS 2204936  11/1977  Fed. Rep. of Germany ...... 198/491

Primary Examiner—Bruce H. Stoner, Jr.
Assistant Examiner—Douglas D. Watts
Attorney, Agent, or Firm—Richard J. Myers

[57] ABSTRACT

A conveyor arrangement for moving steel slabs on motor driven rollers includes a stop assembly which is positionable in the path of movement of the slabs for preventing further movement. The shock of the moving slab against the stop plate is absorbed by a plurality of spherical elastomeric cushion members positioned to achieve maximum cushioning efficiency.

25 Claims, 3 Drawing Figures

CONVEYOR TABLE SLAB STOP ARRANGEMENT

BACKGROUND OF THE INVENTION

1. Field of the Invention

The present invention relates to conveyors. More specifically, the invention relates to an improvement in a power driven conveyor which moves steel plates and which is provided with a power operated vertically moving stop plate to be placed in the path of the slabs for restraining them against further movement.

2. Description of the Prior Art

The present invention is particularly useful in rolling mills or other steel making operations wherein power operated conveyors are utilized to distribute the slabs or plate metal products to various portions of the mill. One of the most frequently used assemblies in the prior art consists of a slab stop comprising a plurality of spaced plates which may have suitable rubber pad sections interspersed between the plates and which as an assembly, move upwardly into a block position restraining further travel of the slabs. This type of arrangement also may include some form of cushion between rigid guide assemblies which are positioned on opposite sides of the stop plate to thereby effect a cushioning action. The types of cushions used wherein the plates are interspersed with rubber cushions, or where the entire plate structure is also cushioned by means of vertical support guide plates, is that effective cushioning action has not been successfully produced, and it is the object of the present invention to provide an improved construction which will solve the problems of the prior art. In the present arrangement the novel positioning of spherical elastomeric members on opposite sides of a vertically moving stop plate create an effective stop and provides for effective cushioning means not found in prior art structures.

SUMMARY OF THE INVENTION

In the present arrangement a conveyor arrangement 10 may be suitably supported on a concrete structure 12 which may be substantially level with the ground and includes a concrete pit 13 within which a conveyor product stopping arrangement 11 is supported. The conveyor arrangement 10 comprises power driven roller 19 on which the product, namely, slabs or steel plates are transferred horizontally from the rolling mill to other desired destinations. The stopping arrangement 11 includes a vertically movable stop plate 27 which is moved vertically by means of fluid extensible devices 31 raising the plate 27 upwardly through the spaced conveyor rollers 19 in the path of movement of the slab or plate which is to be conveyed on the conveyor arrangement. This stops movement of the slabs A and upon return of the stop plate to its original position below the roller conveyors the slabs can again function in their movement as desired. The present invention resides in the particular cushioning of the stop plate 27 which is essential and most important because of the tremendous impact forces to which the stop plate is subjected during its movement into the stop position. The stop plate is guided vertically between upper and lower rows of spherical shock absorbing assemblies 38 which have portions rigidly supported on various portions of the conveyor product stopping arrangement 11. Movement of the stop plate 27 is guided by means of upper and lower guide beam structures 37 and 35 disposed on opposited sides of the stop plate 27. These structures cooperate with the spherical shock absorbing elastomeric members 38 which also are positioned on opposite sides of the stop plate 27.

DESCRIPTION OF THE PREFERRED EMBODIMENT

Figure 1:
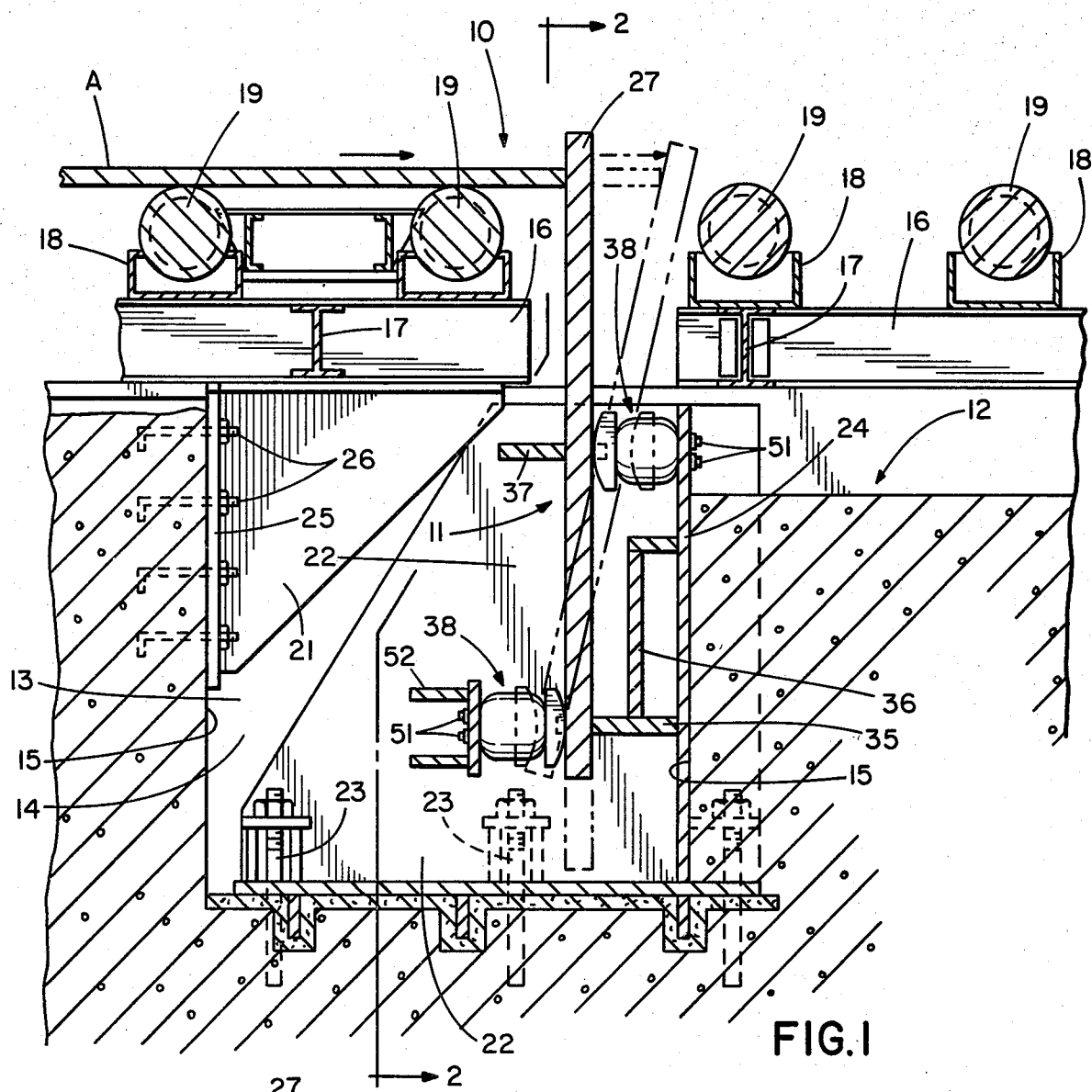
FIG. 1 is a cross-sectional view through a portion of a conveyor and disclosing a slab stop arrangement.
Figure 2:
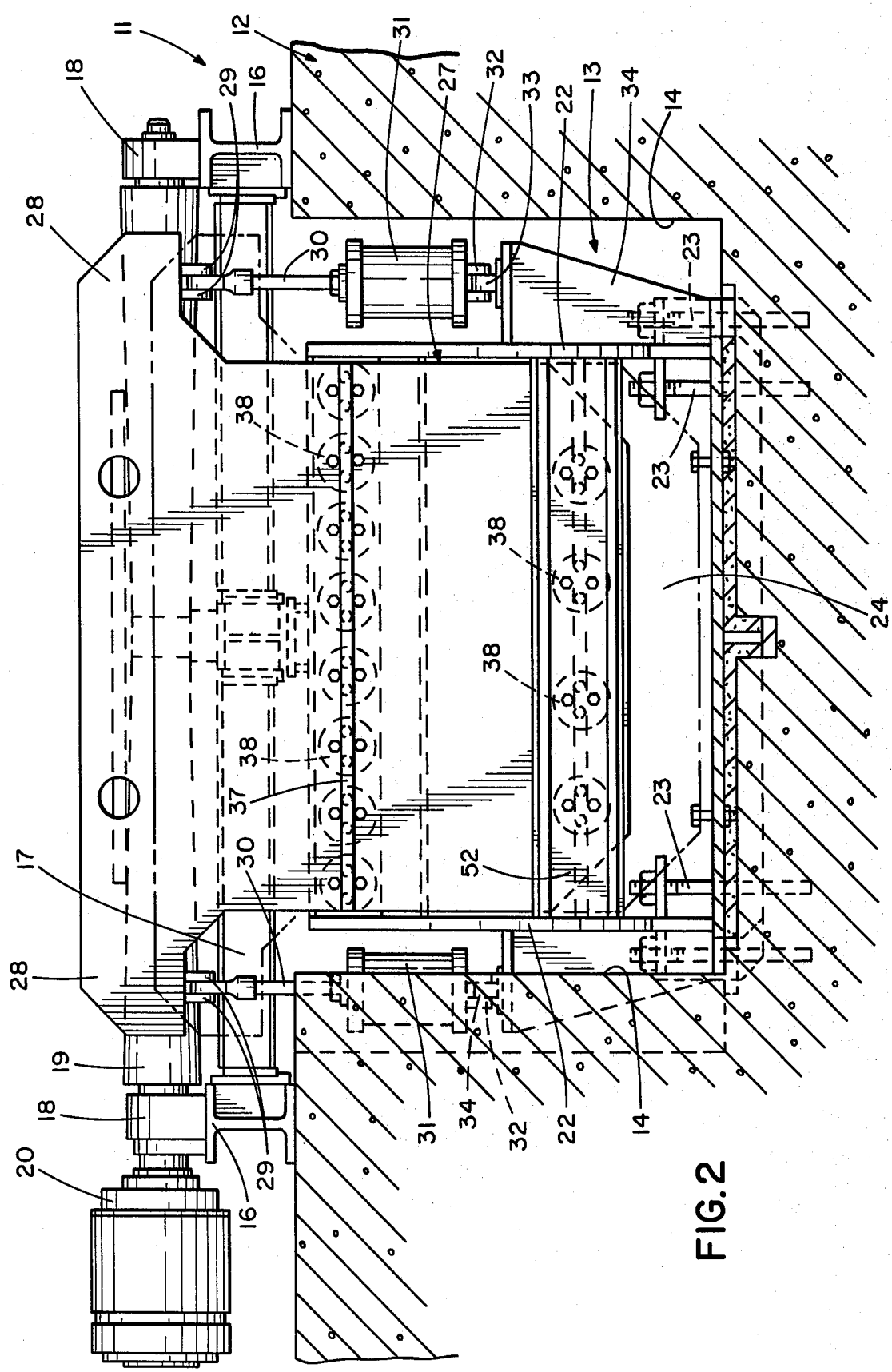
FIG. 2 is a cross-sectional view taken substantially along the line 2—2 of FIG. 1.

Referring particularly to FIGS. 1 and 2 a conveyor arrangement 10 is positioned in proximity to a conveyor product stopping arrangement 11 suitably supported on a concrete structure 12 which in turn is suitably built into the ground substantially adjacent the surface thereof. The concrete structure 12 includes a pit 13 having side walls 14 and end walls 15. The conveyor arrangement 10 as indicated in FIG. 2 is suitably supported on the concrete structure 12 by means of longitudinally extending I-beams 16 carried by the concrete structure 12 on opposite sides of the pit 13. The I-beams 16 form part of the conveyor arrangement 10 and are suitably in turn connected by transverse I-beam supports 17. The conveyor arrangement 10 also includes roller bearing support structures 18 which are carried on the I-beams 16 and in turn have transversely extending conveyor rollers 19 journalled thereon. The rollers 19 of the present conveyor arrangement 10 include drive motors 20 so that the slabs or materials transported on the conveyor is power driven in its movement. The product to be transported on the conveyor structure 10 as shown in FIG. 1 may be a slab or plate of metal A which is in the process of being transported from the rolling mill. The pit 13 also has contained therein a plurality of support brackets 21 which as best shown in FIG. 1 support the transversely extending I-Beam 17 in the pit area. The support brackets 21 include flanges 25 which are rigidly connected to one of the end walls 15 by means of suitable concrete anchor fasteners 26. As best shown in FIG. 2 vertical side plate structures 22 are parallel to the walls 14 and are suitably connected by concrete anchoring bolts 23. As shown in FIG. 1 the side plates 22 extend toward one of the end walls 15 and each is suitably connected thereto. A vertical end wall plate 24 also is rigidly connected to the side plates 22 and is supported against the end walls of the concrete structure 12 of the pit.

Figure 3:
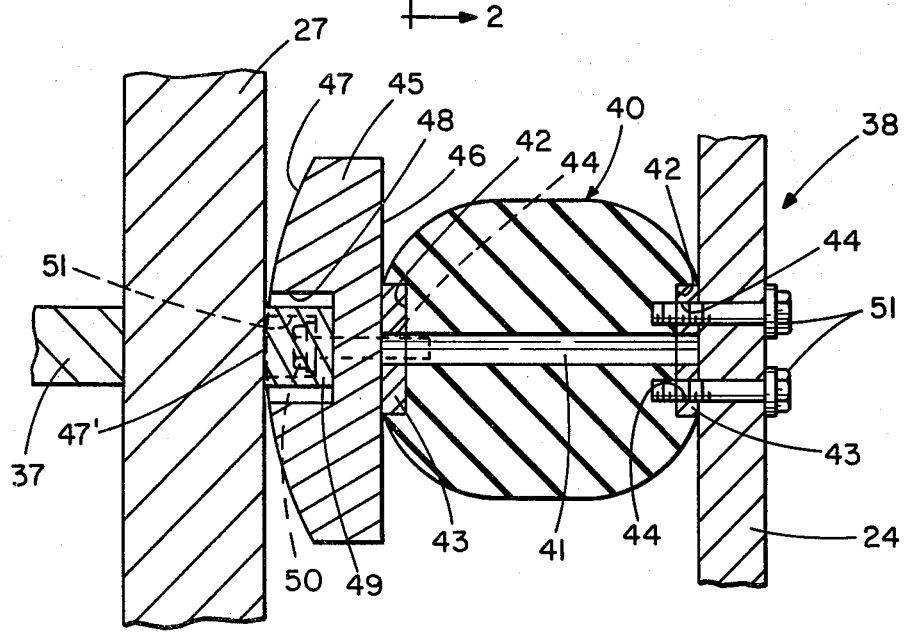
FIG. 3 is a detailed cross-sectional view of a slab stop shock absorbing arrangement.

A stop plate 27 is shown in FIGS. 1 and 2 and at its upper end includes outwardly extending arms 28 which as best shown in FIG. 2 include downwardly projecting ears 29 which are suitably pivotally interconnected with a vertically movable piston rod 30 connected to a piston (not shown) movable within a fluid extensible device 31. The fluid extensible device 31 may be suitably connected to a source of air or hydraulic pressure as desired for reciprocating the piston rods 30 vertically. The extensible devices 31 are also pivotally connected by means of ears 32 to upwardly extending pivot brackets 33 in turn rigidly connected to side brackets 34. The side brackets 34 are suitably supported on the sides of the vertical walls or plates 22 and on the concrete structure. Vertical reciprocating movement of the stop plate 27 is guided by means of the lower transverse guide beam 35 which is suitably connected to the end plate 24 by means of a bracket structure 36. Upper guide beam 37 disposed on the opposite side of the stop plate 27 also serves to guide the vertical movement of the stop plate 27. Upper and lower rolls of spherical elastomeric shock absorbers 38 are provided on opposite sides of the vertical stop plate 27. The construction of these is best shown in FIG. 3 and each includes a spherical rubberlike cylindrical body 40 of rubberlike material having a central opening 41. The body 40 includes on opposite ends thereof end cavities 42 within which metal discs or plates 43 are bonded. Each of the metal discs 43 includes a pair of threaded openings 44 which provides for securing of the shock absorbers 38. This securing means includes cap screws 51 extending through plate 24 and in threaded engagement with threaded opening 44. As shown in FIG. 3 the threaded openings 44 on one side of the body extends in one direction and the two threaded openings 44 at the other end of the body extends in a perpendicular direction with respect to the first mentioned openings. The thrust disc 45 includes a flat surface 46 and a curved outer surface 47, the surfaces 47 being in sliding engagement with respect to the opposite faces of the stop plate 27 as best shown in FIG. 3. The shock absorbers 38 on the lower left side of the stop plate 27 are mounted on a transverse bracket structure 52, of channel shape, fixedly welded to the side plate structure 32. The absorbers are so mounted that the thrust disc curved surfaces 47 are in engagement with the opposite sides of the stop plate 27. The thrust disc 45 is provided with a recess 48 which includes a plug 49 having an outer surface 47' conforming to the surface 47 of the thrust disc 45. The plug 49 includes a recess 51 within which a cap screw and washer 50 is disposed and which extends through the thrust disc 45 into threaded engagement with the threaded openings of the discs 43 disposed on the left hand side of the elastomeric body 40 as best shown in FIG. 3.

The type of shock absorbers 38 herein described is known by the commercial trade name LASTOSPHERE or LATTISPHERE owned by Lord Manufacturing Company, Erie, Pa. and described in their Bulletin D-747 copyrighted 1974, available from Vehicle Products, Department 2H, Lord Corporation, Erie, Pa. 16512. The type of spherical configuration and qualities of the present elastomer shock absorber are particularly desirable in the present design when arranged in the manner indicated in the drawings.

OPERATION

As best shown in FIG. 1 the stop plate 27 has been placed in blocking position relative to the slab A so that Slab A engages and hits the stop plate 27 moving it to the dotted line position shown in this figure. The stop plate is of course pivotally mounted in its connection as indicated at 33 in FIG. 2 and the shock forces are absorbed by the elastomeric spherical units 38 which have been described. Thus the stop plate assumes the diagonal position shown in FIG. 1 and the shocks are fully absorbed since the pivoting action causes both of the upper and lower shock absorbers by virtue of the positioning to be effective in the snubbing or shock resisting action. The stop plate 27 moves slidably vertically relative to the thrust discs 45 which also are effective in the guiding of the movement with the guides 37 and 35. Vertical sliding movement of the stop plates is achieved when predetermined actuation of the fluid extensible devices is accomplished or desired to stop further movement of the slabs on the conveyor. Thus the advantages of the present arrangement over the prior art appear to be clear and distinctive.

What is claimed is:

1. In a conveyor arrangement having a plurality of horizontally spaced conveyor members adapted to support and convey products in a horizontal direction, the improvement of a stop mechanism for stopping the movement of said products comprising:

a stop element supported on said arrangement for movement to a blocking position blocking movement of said product, means associated with said stop element for moving the same between blocking and non-blocking positions, a shock absorbing means including first spherical elastic means supported on said arrangement on one side of said stop element, second spherical elastic means supported on said arrangement on the other side of said stop element, means operatively associated with the stop element and providing for diagonal tilting of the stop element, and whereby said first and second elastic means engage and guide opposite sides of said stop element during said movement of said stop element to the blocking position and whereby during blocking of said products said stop element is tilted diagonally and the shock forces are absorbed by said spherical elastic means.

2. The invention in accordance with claim 1, said stop element comprising a vertically movable plate member, and said conveyor members comprising rollers, whereby said plate member projects vertically upwardly between said rollers when stop elements is in said blocking position.

3. The invention in accordance with claim 2, said spherical elastic means comprising a plurality of elastic springs horizontally supported on said arrangement.

4. In a conveyor arrangement having a plurality of horizontally spaced conveyor members adapted to support and convey products in a horizontal direction, the improvement of a stop mechanism for stopping the movement of said products comprising:

a stop element supported on said arrangement for movement to a blocking position blocking movement of said product, means associated with said stop element for moving the same between blocking and non-blocking positions, a shock absorbing means including first spherical elastic means supported on said arrangement on one side of said stop element, and second spherical elastic means supported on said arrangement on the other side of said stop element, whereby said first and second elastic means engage and guide opposite sides of said stop element during said movement of said stop element to the blocking position and whereby during blocking of said products said stop element is tilted diagonally and the shock forces are absorbed by said spherical elastic means, said spherical elastic means comprising a first row of elastic springs supported on said arrangement and engageable with a first side of said stop element intermediate opposite vertical ends thereof, and a second row of elastic springs supported on said arrangement and engageable with an opposite second side of said stop element adjacent a lower end thereof.

5. The invention in accordance with claim 4,
said stop element comprising a vertically movable plate member,
motor means connected to said plate member for raising and lowering the same
said conveyor members comprising rollers whereby during blocking movement said plate member projects vertically upwardly between said rollers.

6. The invention in accordance with claim 5,
each said elastic spring comprising a rubberlike material, and
said motor means comprising a fluid extensible device.

7. The invention in accordance with claim 4,
including a first support bracket on said arrangement positioned on the opposite second side of said stop element substantially opposite said first row of elastic springs, and
a second support bracket positioned on said arrangement on the first side of said stop element substantially opposite said second row of elastic springs.

8. The invention in accordance with claim 7,
said elastic springs and support brackets providing vertical guiding means for said stop element.

9. The invention in accordance with claim 8,
said spherical springs each comprising a rubber-like material including a cylindrical body,
connector plates bonded to said body at opposite ends thereof,
said arrangement including vertical supports for each row of springs,
and attaching means connected to said supports and one of said connector plates.

10. The invention in accordance with claim 9,
including a thrust and guide plate member connected to the other of said connector plates.

11. For a conveyor arrangement having a plurality of horizontally spaced conveyor members adapted to support and convey products in a horizontal direction, an improved stop mechanism for stopping the movement of said products comprising:
a stop element mounted on said arrangement vertically movable between a first blocking position for stopping the movement of said products and a second non-blocking position,
actuating means for moving said stop element between said blocking and non-blocking positions, and
shock absorbing means in the arrangement engaging said stop element comprising elastromeric shock absorbers,
means operatively associated with the stop element and providing for horizontal displacement of the stop element upon impact thereof by the products,
whereby blocking of said products by said stop element horizontally displaces the upper portion of said stop element transmitting shock forces thereby generated to said shock absorbing means.

12. For a conveyor arrangement having a plurality of horizontally spaced conveyor members adapted to support and convey products in a horizontal direction, an improved stop mechanism for stopping the movement of said products comprising:
a stop element mounted on said arrangement vertically movable between a first blocking position for stopping the movement of said products and a second non-blocking position,
actuating means for moving said stop element between said blocking and non-blocking positions, and
shock absorbing means in the arrangement engaging said stop element comprising horizontally spaced elastomeric shock absorbers disposed on opposite sides of said stop element,
means operatively associated with the stop element and providing for horizontal displacement of the stop element upon impact thereof by the products,
whereby blocking of said products by said stop element horizontally displaces the upper portion of said stop element transmitting shock forces thereby generated to said shock absorbing means.

13. For a conveyor arrangement having a plurality of horizontally spaced conveyor members adapted to support and convey products in a horizontal direction, an improved stop mechanism for stopping the movement of said products comprising:
a stop element mounted on said arrangement vertically movable between a first blocking position for stopping the movement of said products and a second non-blocking position,
actuating means for moving said stop element between said blocking and non-blocking positions, and
shock absorbing means in the arrangement disposed on opposite sides of said stop element engaging said stop element,
said shock absorbing means comprising a first shock absorber engaging the lower portion of one side of said element, and
a second shock absorber engaging the opposite side of said stop element intermediate of said first shock absorber and the top of said stop element,
means operatively associated with the stop element and providing for horizontal displacement of the stop element upon impact thereof by the products,
whereby blocking of said products by said stop element horizontally displaces the upper portion of said stop element transmitting shock forces thereby generated to said shock absorbing means.

14. The invention in accordance with claim 13, wherein
said shock absorbing means comprise elastomeric shock absorbers.

15. The invention in accordance with claim 12, wherein
said shock absorber means are disposed on opposite sides of said stop element.

16. The invention in accordance with claim 12, wherein
said shock absorber means further comprise thrust means engaging said stop element.

17. The invention in accordance with claim 13, wherein
said stop element comprises a plate member, said plate member projecting upwardly through said spaced conveyor members in the blocking position of said stop element.

18. The invention in accordance with claim 12, wherein
said actuating means comprise fluid extensible devices, pivotally connected with said plate member.

19. The invention in accordance with claim 13, wherein
said first and second shock absorbers each comprise a plurality of horizontally spaced elastomeric shock absorber elements.

20. The invention according to claim 13 and said means providing for displacement of the stop element including pivoting means for pivotal action of said stop element.

21. The invention according to claim 20 and said pivoting means being operatively connected with said actuating means to provide said pivotal action of the stop element and the actuating means.

22. The invention in accordance with claim 13, wherein
said shock absorber means further comprise thrust means engaging said stop element.

23. The invention in accordance with claim 12, said stop element comprises a plate member, said plate member projecting upwardly through said spaced conveyor members in the blocking position of said stop element.

24. The invention in accordance with claim 12, and said means providing for displacement of the stop element including pivoting means for pivoted action of said stop element.

25. The invention in accordance with claim 24, and said pivoting means being operatively connected with said actuating means to provide said pivoted action of said stop element and the actuating means.

* * * * *